United States Patent [19]

Flinchbaugh

[11] Patent Number: 5,587,244
[45] Date of Patent: Dec. 24, 1996

[54] LOW PRESSURE MEDICAL SILICONE GASKET

[76] Inventor: David E. Flinchbaugh, 4855 Big Oaks La., Orlando, Fla. 32806

[21] Appl. No.: 923,021

[22] Filed: Jul. 30, 1992

Related U.S. Application Data

[63] Continuation of Ser. No. 625,379, Dec. 11, 1990, abandoned.

[51] Int. Cl.$^6$ .................. B32B 25/20; B65D 53/06; F16J 15/00
[52] U.S. Cl. .................. 428/447; 277/95; 277/96.2; 277/120; 277/121; 277/122; 277/227; 277/228
[58] Field of Search .................. 428/447; 427/387; 277/95, 96.2, 120, 121, 122, 227, 228

[56] References Cited

U.S. PATENT DOCUMENTS

| | | | |
|---|---|---|---|
| 3,445,420 | 5/1969 | Kookootsedes et al. | 260/37 |
| 3,639,155 | 2/1972 | Hartlein et al. | 428/451 |
| 4,163,082 | 7/1979 | Romenesko | 428/447 |
| 4,503,208 | 3/1985 | Lin et al. | 528/15 |
| 4,504,629 | 3/1985 | Lien et al. | 525/288 |
| 4,563,539 | 1/1986 | Gornowicz et al. | 556/421 |
| 4,575,545 | 3/1986 | Nakos et al. | 526/242 |
| 4,575,546 | 3/1986 | Klemarczyk et al. | 526/245 |
| 4,595,635 | 6/1986 | Dubrow et al. | 428/447 |
| 4,640,939 | 2/1987 | Cavezzan et al. | 522/99 |
| 4,665,147 | 3/1987 | Lien et al. | 528/15 |
| 4,675,346 | 1/1987 | Lin et al. | 522/39 |
| 4,791,186 | 12/1988 | Janik et al. | 528/32 |
| 4,911,974 | 3/1990 | Shimizu et al. | 428/143 |
| 4,943,596 | 7/1990 | Gross et al. | 521/82 |

FOREIGN PATENT DOCUMENTS

| | | |
|---|---|---|
| 0240162 | 10/1987 | European Pat. Off. . |
| 0326712 | 8/1989 | European Pat. Off. . |

OTHER PUBLICATIONS

Chemical abstract, Accession No. 112: 181187r "Photocurable Siloxane Rubber Compositions".

*Primary Examiner*—D. S. Nakarani

[57] ABSTRACT

A composite silicone material comprising a flexible, resilient core body of cured silicone elastomer, which has been post-cured with a silicone release agent applied to an exterior surface portion of the core body, thereby incorporating the silicone release agent with the core body to form a skin on the core body having reduced adherence character, as compared to the silicone core body per se.

Also disclosed is a composite silicone material comprising a series of silicone release agent/silicone oil layers thereon wherein each silicone release agent/silicone oil layer has been cured prior to the application of the next succeeding release agent/oil layer. The composite silicone materials of the invention may be employed to form sealing elements, closure members, etc., in a wide variety of structural applications.

1 Claim, 1 Drawing Sheet

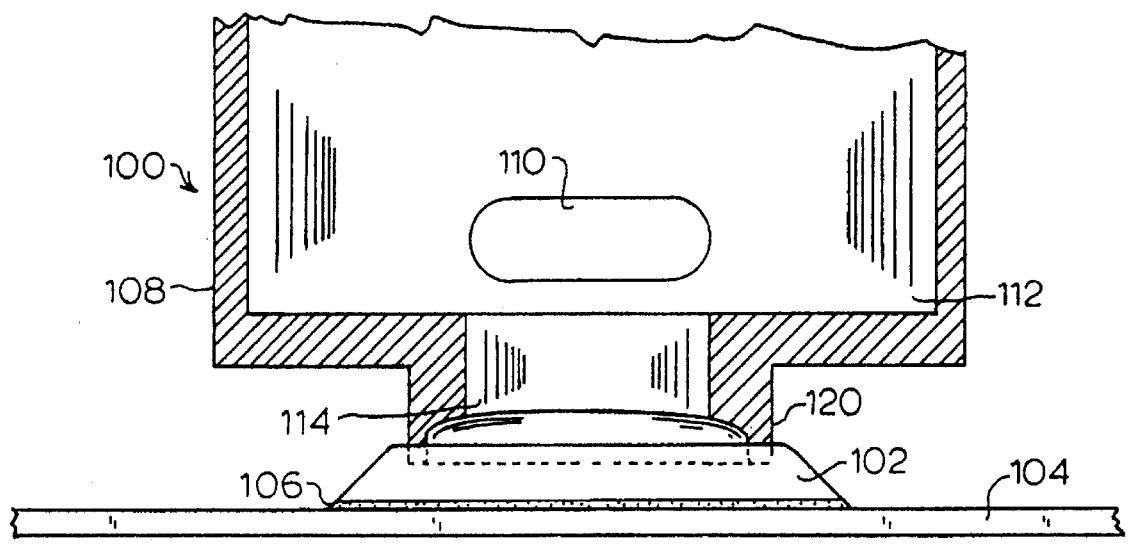
FIGURE

LOW PRESSURE MEDICAL SILICONE GASKET

CROSS REFERENCE TO RELATED APPLICATION

This is a File Wrapper Continuation of U.S. application Ser. No. 07/625,379 filed Dec. 11, 1990, now abandoned.

BACKGROUND OF THE INVENTION

1. Field of the Invention

This invention relates generally to silicone compositions, and more specifically to a composite silicone material comprising a flexible, resilient silicone elastomer, which is adaptable for use in a variety of structural applications, such as including valve closure sealing elements, and the like. The invention also relates to a method of making such composite silicone materials, and to structural elements and assemblies comprising same.

2. Description of the Related Art

In the field of silicone chemistry, a variety of silicone compounds, polymers, and formulations have been developed for applications including sealants, conformal coatings, potting compositions lubricants, greases, and article applications such as contact lenses, elastic tubing, and the like. Various silicone materials are available in sterile form, and are usefully employed in a wide variety of medical-related applications.

In the numerous silicone systems developed to date, a wide variety of curable types of silicones have been developed, e.g., moisture-cure silicones, radiation-cure silicones, heat cure silicones, anaerobic cure silicones, etc.

By way of example, heat-cure addition-reaction silicone compositions are known and in wide use in a variety of applications. These compositions typically contain a polysiloxane having vinyl or other unsaturated functionality, in combination with a siloxane hydride containing silicon-bonded hydrogen, and with a platinum-group hydrosilation catalyst.

U.S. Pat. No. 3,445,420 to G. J. Kookootsedes, et al, describes curable silicone compositions which are curable by heat or exposure to atmospheric moisture in the presence of a platinum group metal catalyst, comprising an olefin-containing organosilicon polymer, an organosilicon compound containing silicon-bonded hydrogen atoms, and an acetylenic inhibitor compound. The disclosed composition is said to be useable as elastomers, potting compounds, sealants, dielectric gels, resins, coatings, and the like.

U.S. Pat. No. 4,640,939 to Cavezzan et al describes gelation-resistant, long pot life organopolysiloxane compositions comprising (i) a substantially straight-chain organopolysiloxane with at least two alkenyl, e.g., vinyl, silicon atom-bonded groups (ii) an organohydropolysiloxane with at least two hydrogen atoms bonded to a silicon atom, (iii) a platinum group metal catalyst, and (iv) an azodicarboxylate inhibitor in which the organo terminal groups are $C_1$–$C_8$ alkyl. Such composition is said to be usefully employed for anti-adhesive/release coating applications, on paper or other substrates bearing peelable coatings.

U.S. Pat. No. 4,791,186 to Janick et al discloses a single package, storage-stable, heat-curable silicone composition comprising (i) an organosiloxane copolymer consisting essentially of stated molar percentages of specified mono-functional, difunctional, and trifunctional siloxane units (ii) an organohydrogensiloxane containing at least two silicon-bonded hydrogen atoms per molecule, (iii) a platinum catalyst, and (iv) an amine inhibitor of specified formula.

European Patent Application 326,712 of Toray Silicone Company, Ltd., describes an addition-curable silicone composition comprising (i) an organopolysiloxane having at least two silicone-bonded alkenyl groups in each molecule, (ii) an organopolysiloxane having at least two silicon-bonded hydrogen atoms in each molecule, (iii) a platinum-group catalyst, and (iv) a mixture or reaction product of (a) a compound which lacks silicon atoms and which contains at least one alcoholic hydroxyl group and at least one alkenyl group in each molecule, and (b) an organosilane having at least one alkoxy group, and at least one epoxy, methacryloxy, or acryloxy group in each molecule. This silicone composition may also contain various additives, such as fillers, e.g., silica balloons, pigments, heat stabilizers, oxidation inhibitors, flame-retardants, etc. This composition is curable by heating or at ambient temperature.

U.S. Pat. No. 4,943,596 to D. C. Gross, et al describes silicone foam compositions comprising (i) a vinyl-terminated polydiorganosiloxane, (ii) a siloxane hydride, (iii) a hydroxylated material, such as water, $C_1$–$C_8$ alkanols, silanols, and mixtures thereof, (iv) a platinum metal catalyst, and (v) a silicone polyimide block copolymer having from 1% to 75% by the weight of the copolymer. As described at column 5, lines 13–22, the silicone composition of this patent is a two-part formulation, with one part comprising the siloxane hydride, and the other part comprising the vinyl-containing siloxane, the hydroxy source material, the platinum catalyst, and the silicone polyimide block copolymer.

U.S. Pat. No. 4,563,539 to G. A. Gornowicz, et al describes UV-curable acrylofunctional silicones which are formed by reaction of aminoalkyl or diaminoalkyl silicones with isocyanato acrylates.

Other acrylic functional silicone references include: U.S. Pat. No. 4,503,208 (preparation of acrylate and 2-alkyl acrylate silicones which are curable by UV exposure, heat, or anaerobic conditions, by hydrosilation of an acrylate or 2-alkyl acrylate ester of an acetylenic alcohol with silicon hydride functional silicones); U.S. Pat. No. 4,575,546 (radiation-curable silicone polymers with a plurality of acrylic groups clustered at or near the chain ends thereof); U.S. Pat. No. 4,575,545 (same); U.S. Pat. No. 4,675,346 (silicone resin with terminal acrylic groups and intermediate region free of acrylic groups, formulated with fumed silica filler and photoinitiator, and curable by UV radiation); U.S. Pat. No. 4,504,629 (graft polymers having $\alpha$-alkyl acrylate group, and an aliphatically unsaturated polymer, e.g., a polyorganosiloxane); and U.S. Pat. No. 4,665,147 (methacrylated siloxanes prepared by hydrosilation of beta(allyloxy) ethylmethacrylate using a silicon hydride functional siloxane).

Photocurable siloxane rubber compositions are described in Japanese Kokai Tokkyo Koho JP 01 301708, and European Patent Application 0 240 162 A2 describes liquid polyorganosiloxane compositions that cure by a hydrosilation reaction to yield optically transparent elastomers.

Despite their many and extensive uses, silicones generally have not been employed in structural applications (i.e., used as a structural element) when in an elastomeric, gelatinous state having a low Shore (00) durometer hardness, e.g., less than about 50, due to their lack of rigidity, despite the fact that such materials are durable and their use would otherwise be highly desirable in character. An example is applications involving substantial differential thermal expansion characteristics, where a silicone elastic material might usefully be employed as a structural sealing element between contacting parts possessing substantially different thermal conductivity and heat capacity characteristics, in end use environments of rapidly changing temperature. Another example is applications where soft, pliable, and resilient materials of construction are desired for elements which are expandable or otherwise must accommodate deformational stresses or pressures (e.g., gaskets, bushings, and valve closure seals in pressurized hydraulic systems). In these applications, hard silicone compositions generally lack sufficient elasticity, and their use entails the risk or occurrence of failure of the silicone structural element, with consequent adverse affect on the efficiency or utility of the device in which such element is employed.

Accordingly, it would be a significant advance in the art to provide a silicone composition having utility for structural applications, which takes advantage of the desired elastic, resilient character of low durometer silicone elastomer materials, but also possesses sufficient structural integrity for such applications.

It is therefore an object of the present invention to provide a silicone composition of such type, together with a method of making same which is readily and economically carried out.

Other objects and advantages of the invention will be more fully apparent from the ensuing disclosure and appended claims.

SUMMARY OF THE INVENTION

In one aspect, the present invention relates to a composite silicone material, comprising:

a flexible, resilient core body formed of cured silicone elastomer, which has been post-cured with a silicone release agent applied to an exterior surface portion of the core body, wherein the post-cure has been carried out at sufficient temperature and for sufficient time to incorporate the silicone release agent with the core body, so that the core body exterior surface portion is re-cured in contact with the silicone release agent to form a skin on the core body at the exterior surface portion, and wherein the skin has a reduced adherent character as compared to the exterior surface portion prior to treatment and post-cure with the silicone release agent.

The cured silicone elastomer may be any suitable silicone elastomer material, as for example a thermally-activatable, addition-curable silicone formulation comprising (1) a polysiloxane having at least one alkenyl group per molecule, (2) a siloxane containing silicon-bonded hydrogen atoms, and (3) an effective amount of a platinum group metal catalyst, wherein the formulation has been subjected to suitable elevated temperature curing conditions to cure same. Alternatively, the cured silicone elastomer may be an acrylofunctional silicone elastomer or other UV-curable silicone elastomer, or a silicone elastomer cured by moisture curing, or any other suitable silicone elastomer material cured by any suitable curing conditions.

In another aspect of the present invention, the composite silicone material is formed as first above described, but with a silicone oil coated on the applied silicone release agent prior to the post-curing.

In a related aspect, a series of release agent applications alternating with silicone oil coatings is successively built up on the core body and each application of release agent and coating of silicone oil is cured prior to the next succeeding application of silicone release agent and coating of silicone oil.

Still another aspect of the present invention relates to a structural article comprising a composite silicone material of the type broadly described hereinabove, in which the composite silicone material is adhesively bonded at a surface thereof which has not been treated by application of silicone release agent or coating with silicone oil, to a substrate member. Such structural article may be employed in a structural assembly (device) in which the skin of the composite material is employed as a sealing surface, against which a seal member of the device is selectively compressively engaged. Thus, the invention contemplates a sealing structure which is particularly adaptable for low pressure sealing applications, employing a sealing element formed of a composite silicone material of the type broadly described hereinabove.

A further aspect of the present invention relates to a method of making a composite silicone material, comprising:

providing a silicone elastomer;

applying a silicone release agent to a selected exterior surface portion of the silicone elastomer; and curing the silicone release agent on the silicone elastomer for sufficient time and at sufficient temperature to form a skin of decreased adherence relative to the silicone elastomer per se.

Another aspect of the above-described method comprises the further step of applying a silicone oil to the applied silicone release agent, and curing same concurrently together.

A still further method aspect relates to applying succeeding layers of silicone release agent and silicone oil to a elastomer material, and curing the applied layers to form a skin on the cured silicone elastomer having reduced adherence characteristics as compared to the silicone elastomer material per se.

The cured silicone elastomer material in the foregoing compositions, articles, and method aspects of the invention has a Shore (00) durometer hardness which preferably is less than 50, and more preferably is from about 2 to about 20.

Other aspects and features of the invention will be more fully apparent from the ensuing disclosure and appended claims.

BRIEF DESCRIPTION OF THE DRAWING

The sole FIGURE is a schematic representation of a valve assembly employing a silicone sealing element according to one embodiment of the present invention.

DETAILED DESCRIPTION OF THE PREFERRED INVENTION, AND PREFERRED EMBODIMENTS THEREOF

The present invention is based on the surprising and unexpected discovery that a very soft, flexible, resilient silicone elastomer material, having a low Shore (00) durometer value, e.g., less than 50, and more preferably from about 2 to about 20, can be utilized in various structural applications, such as in low pressure sealing applications, by treating the cured silicone elastomer with a silicone release agent and post-curing same at sufficient temperature and for sufficient time to incorporate the silicone release agent with the cured elastomer material and form a skin on the elastomer material having reduced adherence or stickiness as compared to the elastomer material per se (i.e., prior to treatment and post-curing with the silicone release agent).

A related discovery is that such silicone release agent treatment may be combined with the application of a silicone oil to the applied silicone release agent, and concurrent post-curing of the release agent and oil on the silicone elastomer, to provide a skin on an exterior surface of the elastomer material, which is highly lubricious in character. Such silicone release agent/silicone oil application may further be repeated, after post-curing of a preceding layer of release agent and oil, to build up a series of independently cured layers which provide an outer skin on the elastomer which may be widely varied in properties, depending on the intended end use application for the resulting composite material.

Further, the composite silicone material, comprising a cured silicone elastomer core body with an outer skin deriving from the silicone release agent, may be prepared with an exterior surface portion of the core body being untreated with silicone release agent (or silicone oil), and such untreated surface portion may suitably be bonded to a substrate element or support member, by any of readily commercially available silicone adhesives, to produce a structural article for use in structural assemblies, as hereinafter more fully described.

The cured silicone elastomer which forms the flexible, resilient core body of the composite silicone material of the invention, may suitably comprise any silicone elastomer material which is compatible with the silicone release agent (and silicone oil if used) employed in the treatment of the elastomer to form an outer skin thereon, and which provides the required performance in the end use intended for the treated elastomer.

As indicated hereinabove in the "Background of the Invention" section hereof, a wide variety of silicone compositions which may be employed in the broad practice of the present invention are known and readily commercially available.

By way of example, the cured silicone elastomer may be formed by addition reaction of a siloxane containing ethylenic unsaturation, in combination with a siloxane or silane containing silicone-bonded active hydrogen functionality, e.g., a functionality selected from the group consisting of:
—H;
—OH;
—N(R')$_2$, wherein each of the R' substituents is independently selected from hydrogen, halo, and organo groups, with the proviso that at least one R' substituent is hydrogen;
—SH; and
—SO$_3$H,
in the presence of a suitable catalyst, such as a platinum group metal catalyst. Various elastomeric silicone compositions based on addition reaction of (1) vinyl-functional silicones and (2) silicones or silanes containing silicon-bonded hydrogen are readily commercially available and such compositions are preferred addition-cured silicone elastomers materials in the broad practice of the present invention.

Alternatively, the silicone elastomer may be an acrylofunctional silicone material which is cured by ultraviolet radiation or other actinic radiation, under photoinitiating (radiation exposure) curing conditions, and/or by other curing methods. As described hereinabove in the "Background of the Invention" section hereof, various acrylic silicones are known which are curable by UV exposure, heat, and/or anaerobic conditions, as for example the silicone compositions described in U.S. Pat. No. 4,503,208.

A variety of moisture-curable silicone elastomers are also known and readily commercially available, in which the silicone has moisture-curing character as a result of functionality such as:
amino;
vinyl;
hydrogen;
enoloxy;
hydroxy;
alkoxy;
aryloxy;
oxime;
—OOCR$_{13}$;
N,N-dialkylamino;
N,N-dialkylaminoxy;
N-alkylamido;
—O—NH—C(O)—R$_{13}$;

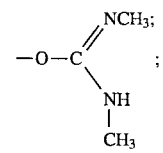

—O—C(CH$_3$)=CH$_2$; and
—S—C$_3$H$_6$Si(OCH$_3$)$_3$;
wherein R$_{13}$ is H or hydrocarbyl.

When moisture-cure silicones are employed for the cured silicone elastomer in the practice of the present invention, the moisture curability most preferably is imparted to the silicone by functionality such as alkoxy, enoloxy, amine, acetoxy, and/or oxime, whereby the silicone is curable at ambient conditions in the presence of atmospheric moisture.

Other silicone elastomers are known which are functionalized with oxirane functionality, such as cycloaliphatic epoxy groups, epoxidized novolak functionality, or glycidoxy groups. Silicones with oxirane functionality may be cured at ambient temperature conditions using a variety of known and commercially available curatives, or alternatively may be cured by other mechanisms with known curatives.

A wide variety of curing conditions and curatives may be employed to cure various epoxy materials, as described in "Epoxy Resins, Chemistry and Technology," May and Tanaka, Marcel Dekker, Inc., New York (1973), incorporated herein by reference. By way of example, heat-curing epoxy functionality employed in silicone elastomers may be cured with conventional heat-activated epoxy curatives such as Lewis acid (cationic) catalysts, acid anhydrides, imidazoles, dicyanodiamide, amines and latent amine curatives, and dissociable amine salts.

Silicone elastomers may also contain functionality such as isocyanate functionality which is curable by means of active hydrogen-containing compounds, such as silanols, polyesters prepared from polycarboxylic acids and polyhydridic alcohols, polyhydric polyalkylene ethers having at least two hydroxy groups, polythioether glycols, polyester amides, etc.

The most preferred silicone elastomers are those which are formed by reaction of vinyl-containing silicone resins with cross-linking agents such as hydride-containing resins, e.g., a polysiloxane containing at least two silicon-bonded hydrogen atoms per molecule, and which may be cured at elevated temperature, or at ambient (room) temperature, in the presence of a suitable catalyst.

Accordingly, a wide variety of silicone elastomer materials is available which may be cured under curing conditions such as ambient temperature exposure, moisture exposure, elevated temperature exposure, reaction with curative species, and radiation exposure.

The choice of a specific silicone elastomer material in the practice of the present invention will depend on the silicone release agent, (optional) silicone oil, and other materials which are employed with the cured silicone elastomer in the desired end use formulation, and the end use properties desired in the product silicone material.

Desirably, the Shore (00) durometer hardness of the cured silicone elastomer employed in the practice of the present invention is less than 50, and preferably is from about 2 to about 20. Materials having durometer values in this range are very soft, flexible, and resilient, and are otherwise generally unsuitable as structural elements, however, by virtue of treatment in accordance with the presence invention, such cured silicone elastomers are rendered adaptable for use in various structural applications.

It will be recognized that the durometer value, and related physical and chemical characteristics of the cured silicone elastomer, are a functional of the extent of cross-linking of the silicone (polysiloxane) material. Generally, durometer hardness increases with increasing extent of cross-linking of the silicone material. Concomitantly, as the extent of cross-linking is increased, the flexible, deformable, resilient character which is typical of the uncrosslinked silicone elastomer, is progressively decreased.

It will be appreciated that the silicone materials illustratively described hereinabove may be crosslinked only to a limited extent in order to ensure their flexible, resilient, elastomeric character, as is well known to those skilled in the art. This may be accomplished, for example, by providing only a selected level of cross-linkable functionality on the silicone material(s) employed in the elastomer formulation, by incorporating chain-termination species in the formulation, or in other ways within the level of skill in the art for producing cured silicone elastomers of desired softness, flexibility, resilience, deformability, etc.

In addition to the silicone elastomer, the silicone formulation may comprise any suitable additives, fillers, adjuvants, reactive diluents, etc., as necessary or desirable for a given application. For example, it may be highly desirable to adjust the texture and properties of the silicone elastomer formulation by incorporating therein a filler such as silica and/or a non-reactive silicone fluid, such as a polydiorganosiloxane material which is devoid of reactive (cross-linking) functionality. Examples of additional constituents optionally includable in the silicone elastomer formulations of the present invention are anti-oxidants, flame retardants, initiators, curatives, accelerators, pigments, etc.

In addition, the silicone elastomer composition may optionally also contain an adhesion promoter, to enhance the adhesive character of the composition for a specific substrate (e.g., metal, glass, ceramic, etc.). Any suitable adhesion promoter constituents may be employed for such purpose, depending on the specific substrate element(s) to be employed in a given application. For example, the adhesion promoter might be selected to enhance adhesion of the composition on substrates formed of materials such as metals, glasses, plastics, ceramics, and mixtures, blends, composites, and combinations thereof. Various organosilane compounds may be usefully employed for such purpose, and such compounds may also desirably feature oxirane functionality, as well as silicon-bonded alkoxy substituents, to provide broad adhesive bonding utility. In such organosilane compounds, the oxirane functionality may be provided by a glycidoxyalkyl substituent on a silicon atom of the silane compound. A particularly preferred adhesion promoter of such type is glycidoxypropyltrimethoxysilane.

In addition, further additives such as MQ or MDQ silicone resins may be incorporated, to vary the properties of the silicone elastomer composition as desired.

Depending on its composition, processing, and intended end use, the silicone elastomer is cured in any suitable manner to provide the flexible, resilient core body of cured silicone elastomer which is used to form the composite silicone material of the present invention.

In a preferred aspect, the silicone elastomer core body is formed as a cast film on a suitable substrate such as a smooth glass or mirror-finished metal surface. For such purpose, the adhesion-enhancing additives hereinabove described may be employed to facilitate bonding of the cast film to the substrate. Alternatively, the cast film may be applied to such substrate after the substrate has been precoated with a layer of suitable grease or release agent, whereby the cast film may be peeled or otherwise removed from the casting substrate. If thus removed from the casting substrate, the surface which is contiguous with the substrate during the casting, may subsequently be used as a bonding surface in bonding the core body of the composite silicone material to another substrate (structural element) for end use thereof.

In any event, the flexible, resilient core body of cured silicone elastomer is treated in accordance with the present invention by applying of a silicone release agent to an exterior surface portion of the core body. This exterior surface portion may constitute the entire exterior surface of the core body, or, more preferably, a part of such exterior surface. The core body to which the silicone release agent has been applied then is post-cured at sufficient temperature and for sufficient time to incorporate the silicone release agent with the core body so that the core body surface is re-cured in contact with the silicone release agent, to form a skin on the core body at such exterior surface portion which has a reduced adherence character as compared to the exterior surface portion prior to treatment and post-curing with the silicone release agent.

The silicone release agent may be any of a wide variety of silicone-based materials which are conventionally employed as release agents in applications such as molding, extrusion, and casting of polymeric materials, to prevent the polymeric material from sticking to the molding, extrusion, or casting surfaces confining and/or shaping the polymer. A particularly preferred silicone release agent is commercially available from Dow Corning Corporation as Dow Corning Silicone Release Agent No. 7.

The release agent may be of any suitable form, generally being in the form of a viscous flowable material or alternatively a grease, and is applied, by any suitable application means and method, and at any suitable thickness, to the surface of the silicone elastomer core body on which the overlying skin is desired to be formed.

By such application, and subsequent curing of the silicone release agent with the silicone elastomer core body, a skin of increased toughness and reduced adherence ("stickiness"), relative to the untreated silicone elastomer per se, is formed on the flexible, resilient core body. The resulting composite mass retains the original flexible, resilient, elastomeric properties of the starting elastomer material in its core, but the core is overlaid with a toughened protective layer deriving from the release agent, which permits the soft, flexible, resilient core body to be utilized in structural applications.

While I do not wish to be bound by any theory or hypothesis as regards the mechanism of formation of the skin on the silicone elastomer core body, it appears that there is a high degree of interpenetration and bonding between the silicone release agent and the core body, which provides a high degree of structural integrity to the overall composite material, and which in turn renders the composite material suitable for a wide variety of structural applications.

The resulting composite silicone material, comprising the flexible, resilient core body and the release agent-based skin, may be further treated by application to the skin of a suitable silicone oil, in order to impart lubricity to the exterior skin surface, such as may be necessary or desirable in a given application. By way of example, such silicone oiling of the skin of the composite material may be desirable where the composite material is employed as a material of construction for a sealing element used in a valve structure. The resulting lubricity of the active sealing surface of the silicone sealing element serves to enhance the degree and ease of sealing between the silicone sealing element and the sealing member which is selectively compressively engaged with the silicone sealing element in the operation of the valve.

It is also contemplated within the broad practice of the present invention to coat a silicone oil on the release agent applied to the core body, and to subject the resulting composite material to elevated temperature post-curing conditions, so that the silicone oil is incorporated with the silicone release agent in the skin of the composite article, as opposed to forming a skin in the post-curing operation from only the silicone release agent alone, and then (after curing has been completed) applying a silicone oil lubricant, if desired, to the exterior skin surface.

By jointly applying a silicone release agent (as an underlying layer) and a silicone oil (as an overlying layer on the release agent layer), it is possible to vary widely the skin characteristics in order to accommodate a desired end use.

Further, it is within the purview of the present invention to apply a succession of such silicone release agent/oil layers, with each silicone release agent/oil layer being cured at a suitable elevated temperature and for a suitable time, prior to application and curing of the next succeeding silicone release agent/oil layer. In this way, a multiplicity of release agent/oil layers can be utilized to vary the skin properties as necessary or desired.

The specific time and temperature of the skin formation step(s) (sometimes herein referred to as "post-curing") may be readily determined by those of ordinary skill, without undue experimentation, by the simple expedient of preparing corresponding samples of the core body and skin-forming layers, and subjecting same to post-curing under differing time/temperature conditions, followed by physical and/or chemical properties determination, to select a suitable time/temperature relationship for skin formation on the core body in the contemplated end use application.

The silicone oil employed in the various techniques of skin formation described above may comprise any suitable silicone-based oil material or formulation which is compatible with the silicone release agent and the core body, which accommodates the post-curing conditions employed, and which yields the desired end-use properties in the resulting composite material. A particularly preferred silicone oil is available from Dow Corning Corporation as Dow Corning® Silicone Fluid 200. Alternatively, the silicone oil may comprise Dow Corning® 360 Medical Fluid, a clear, colorless, polydimethylsiloxane liquid, which is commercially available from the Medical Products Division of Dow Corning Corporation (Midland, Mich.).

Other elastomer formulations which are curable to form the silicone elastomer core body of the present include SILASTIC® Medical Grade ETR Elastomers Q7-4735, Q7-4750, and Q7-4765, commercially available from Dow Corning Corporation (Midland, Mich.), which are two-part formulation silicone elastomers that consist of dimethyl and methylvinyl siloxane copolymers and reinforcing silica. These elastomers are thermally cured via addition-cure chemistry, and may be cured at temperatures of for example 200° F. to about 320° F. for 2 to 10 minutes, or more, as desired.

As previously mentioned, the silicone elastomer core body may be treated with silicone release agent on only a portion of the core body's exterior surface, with the remaining cure body surface (which has not been treated by application of silicone release agent thereto) constituting a bonding surface. For example, the cured silicone elastomer core may be formed as a cast film on a substrate to which a suitable release agent has been applied, whereby the resulting elastomer material is peelable or otherwise removable from the casting substrate, and with the surface of the cured elastomer previously in contact with the casting substrate providing a surface which may be adhesively bonded to another substrate element or structure.

A wide variety of adhesives and bondants may be employed for securing the cured elastomer body of the composite silicone material to a substrate.

For example, various anaerobic adhesives, e.g., cyanoacrylate adhesives, are compatible with various silicone elastomers and may be employed for such bonding.

Alternatively, silicone-based adhesive materials may be employed, and are preferred in instances where physical and chemical properties of the adhesive and the core body must be closely matched, as in instances where the resulting assembly is subjected to large variations in temperature, significant shear or deformational stresses, etc.

A particularly preferred silicone-based adhesive is SILASTIC® Medical Adhesive Type A, commercially available from the Medical Materials Division of Dow Corning Corporation (Midland, Mich.). This adhesive is a one-component, low-slump, translucent silicone material which is useful for bonding silicone elastomers to one another, as well as for bonding silicone elastomers to synthetic (polymeric), glass, or metal substrates. Such preferred adhesive may be applied at a thickness of for example 0.50 to 0.80 mm, or at any other suitable bonding thickness, on one of the surfaces to be bonded, following which the bonding surface of the composite silicone material, and the substrate element, are contacted with one another under pressure to form and maintain a suitable bond thickness of adhesive. This preferred silicone adhesive cures by moisture exposure, at relative humidity levels which preferably are between 20% and 60%, at ambient (room) temperature.

The composite silicone materials of the present invention may variously be employed to form structural articles. In a preferred aspect, as described hereinabove, the composite silicone material is adhesively bonded to a substrate at a surface of the composite which has not been treated by application of silicone release agent and/or silicone oil thereto. The resulting structural assembly may be deployed such that the skin of the composite material is arranged as a sealing surface against which a sealing member is selectively compressively engaged, and disengaged, as in a valve structure. Thus, the composite silicone material may be utilized to form a sealing element, which in turn is a constituent part of a low pressure sealing structure or other end use assembly. Sealing elements of such composite silicone material may be employed to provide a low pressure air-tight and/or water-tight seal in pumps, hydraulic systems, fluidic devices, and the like.

Referring now to the single drawing, the FIGURE is a schematic representation of a valve assembly 100, taken in partial section, and employing a silicone valve sealing element 102 according to one embodiment of the present invention.

The silicone sealing element 102 is formed of a composite silicone material, comprising a flexible, resilient core body of cured silicone elastomer, on the upper and side surfaces of which has been applied a silicone release agent which has been post-cured with the core body at sufficient temperature and for sufficient time to incorporate the silicone release agent with the core body. Thus, the core body surface has been re-cured in contact with the silicone release agent, to form a skin on the core body at its exterior top and side surfaces. This skin has a reduced adherence character, as compared to the core body exterior surfaces prior to application and post-curing of the silicone release agent thereon.

The silicone sealing element 102 is adhesively bonded to substrate 104 by means of a cured adhesive layer 106 which bonds the bottom surface of the sealing element to the substrate top surface.

In this illustrated assembly, the valve body 108 is provided with a liquid inlet port 110 communicating with the interior volume 112 of the housing, which in turn is in flow communication with liquid flow passage 114. The liquid flow passage 114 is circumscribed at its lower portion by a cylindrical wall 120 forming a downwardly projecting valve seat, which can be selectively compressively engaged with the sealing element 102, and disengaged therefrom, as desired. When the lower edge of the valve seat is pushed into the soft sealing element, no liquid can flow around or past the valve seat, and the liquid is retained in the housing above the valve seat.

In this valve assembly, the sealing element 102, having a tough skin on the soft, low durometer silicone core material, accommodates sealing without puncturing of the core body, and with the toughness and non-adherent character of the skin serving to preclude sticking of the valve seat against the sealing element, when the valve seat is desired to be disengaged.

It will be recognized from the foregoing description that the specific composition and structure of the composite silicone material of the present invention may take a variety of forms, depending on the end-use character required for the intended application of such material, but in all cases the composite silicone material comprises a flexible, resilient core body of low durometer character, which is at least partially covered with a skin of relatively tougher character, as compared to the core material per se.

The provision of such composite material achieves a substantial advance in the art, in the utilization of low durometer silicone materials in structural applications, where their use heretofore has been precluded.

The features and advantages of the invention are more fully shown by the following example, wherein all parts and percentages are by weight, unless otherwise expressly stated.

EXAMPLE

A curable silicone elastomer composition is made up by mixing 20 mg of Dow Corning Medical SILASTIC® Q7-4720 Part A with from about 0.5 to about 1.5 mg of Dow Corning Medical SILASTIC® Q7-4720 Part B, with the mixing being effected by thorough stirring but at a sufficiently low stirring speed as to avoid production of bubbles in the mixed material. To this mixture of Part A and Part B, from about 5 to about 10 mg of Dow Corning Silicone Medical Fluid 360, or alternatively Dow Corning Silicone Medical Fluid 200, is carefully blended.

The resulting silicone elastomer formulation then is poured onto a smooth glass surface and placed in an evacuation chamber, following which gas is withdrawn until no sizable bubbles remain in the deposited silicone elastomer film. Prior to application of the silicone elastomer mixture to the glass surface, the glass surface is precoated with a layer of silicone release agent (e.g., Dow Corning Silicone Release Agent No. 7). The glass coated with silicone elastomer formulation then is introduced into a curing oven, and curing is effected at a temperature of approximately 140° F. for about 30 minutes.

Following such cure, the elastomer-coated glass is removed from the oven, and a heavy coating of Dow Corning Silicone Release Agent No. 7 is applied to the cured silicone elastomer film. The release agent-coated elastomeric film then is reintroduced to the oven and post-cured at a temperature of about 140° F. for about 30 minutes.

By such post-curing, a composite silicone material is produced, which comprises an elastomeric core and an overlying skin layer deriving from the silicone release agent post-cured on the core. The composite material may be carefully cut and peeled from the glass surface, and then may be bonded to another substrate element on its bottom surface, using a silicone adhesive such as Dow Corning Medical Type A adhesive. The resulting article features a tough-skinned elastomer which may be lubricated with a silicone oil such as Dow Corning Silicone Fluid 360 or Dow Corning Silicone Fluid 200, to provide a lubricious surface which will close and release reliably under low pressure operation, when used as a valve seal member as described hereinabove with reference to the sole FIGURE hereof.

The composite silicone material described above, prior to its removal from the glass casting surface, may be serially treated by application of layers of silicone release agent and silicone oil thereto, and successively cured to build up the skin on the silicone core body.

While the invention has been described with reference to specific features and embodiments thereof, it will be appreciated that numerous variations, modifications, and alternative embodiments exist, and all such variations, modifications, and embodiments are to be regarded as being within the spirit and scope of the invention.

What is claimed is:

1. A seal or gasket comprising a core body having a shore (00) durometer hardness value of from about 2 to about 20 formed of thermally addition curable silicone elastomer and thereafter post cured by heating of the previously heat cured core body with a silicone release agent applied to an exterior surface of the core body at sufficient temperature and time to incorporate the silicone release agent with the core body to form a deformable non-stick skin on the core body, wherein the skin has a reduced adherence character as compared to said exterior surface of the core body prior to application and post curing with said silicone release agent.

* * * * *